United States Patent
Vallati

(10) Patent No.: US 11,815,469 B2
(45) Date of Patent: Nov. 14, 2023

(54) APPARATUS AND METHOD FOR INSPECTING CONTAINERS WHICH ARE AT LEAST PARTIALLY TRANSPARENT TO A PREDETERMINED ELECTROMAGNETIC RADIATION

(71) Applicant: Stevanato Group S.P.A., Piombino Dese (IT)

(72) Inventor: Luca Vallati, Mira (IT)

(73) Assignee: Stevanato Group S.P.A., Padua (IT)

( * ) Notice: Subject to any disclaimer, the term of this patent is extended or adjusted under 35 U.S.C. 154(b) by 0 days.

(21) Appl. No.: 17/661,180

(22) Filed: Apr. 28, 2022

(65) Prior Publication Data
US 2022/0349831 A1 Nov. 3, 2022

(30) Foreign Application Priority Data
Apr. 28, 2021 (IT) .......................... 102021000010790

(51) Int. Cl.
*G01N 21/88* (2006.01)
*G01N 21/17* (2006.01)

(52) U.S. Cl.
CPC ......... *G01N 21/8851* (2013.01); *G01N 21/17* (2013.01); *G01N 2021/1776* (2013.01);
(Continued)

(58) Field of Classification Search
CPC ............... G01N 21/8851; G01N 21/17; G01N 2021/1776; G01N 2021/8864; G01N 2021/887; G01N 2021/8887
See application file for complete search history.

(56) References Cited

U.S. PATENT DOCUMENTS 3,874,800 A 4/1975 Kossel
4,402,612 A * 9/1983 Alexander ......... G01N 21/9027
356/239.6
(Continued)

FOREIGN PATENT DOCUMENTS

CH 713057 A1 4/2018
DE 102017215719 A1 3/2019
(Continued)

OTHER PUBLICATIONS

European Search Report dated Sep. 23, 2022, issued in corresponding European application.

*Primary Examiner* — Kevin K Pyo
(74) *Attorney, Agent, or Firm* — Husch Blackwell LLP

(57) ABSTRACT

An apparatus for inspecting containers includes a rotation device which is adapted to rotate the container about the axis of symmetry; a camera sensitive to said predetermined electromagnetic radiation and with the container located in the field of view thereof; a processing unit to control the rotation device to move the container at a first angular speed constant for a first time period; acquiring at least a first and a second series of images of a portion of the container in a rotation thereof through 360°; to identify defective areas having at least one characteristic different from the characteristics of adjacent areas, generating first and second maps of the defective areas; to compare the position of the defective areas of the maps; to establish that first impurities are present in the container or in the liquid contained in the container.

17 Claims, 4 Drawing Sheets

(52) U.S. Cl.
CPC .................. *G01N 2021/887* (2013.01); *G01N 2021/8864* (2013.01); *G01N 2021/8887* (2013.01)

(56) References Cited

U.S. PATENT DOCUMENTS

| | | | |
|---|---|---|---|
| 5,523,560 | A | 6/1996 | Manique et al. |
| 6,275,603 | B1 | 8/2001 | Cronshaw et al. |
| 6,498,645 | B1 * | 12/2002 | Knapp ............... G01N 21/9027 356/427 |
| 2005/0248765 | A1 | 11/2005 | Budd et al. |
| 2006/0208172 | A1 | 9/2006 | Akkerman et al. |
| 2008/0230720 | A1 | 9/2008 | Nielsen |
| 2014/0177932 | A1 | 6/2014 | Milne et al. |

FOREIGN PATENT DOCUMENTS

| | | |
|---|---|---|
| EA | 201992857 A1 | 6/2020 |
| EP | 569464 A1 | 11/1993 |
| EP | 858595 A1 | 8/1998 |
| EP | 957355 A2 | 11/1999 |
| JP | 2002357560 A | 12/2002 |
| JP | 2005061932 A | 3/2005 |
| WO | 2020247357 A1 | 12/2020 |

\* cited by examiner

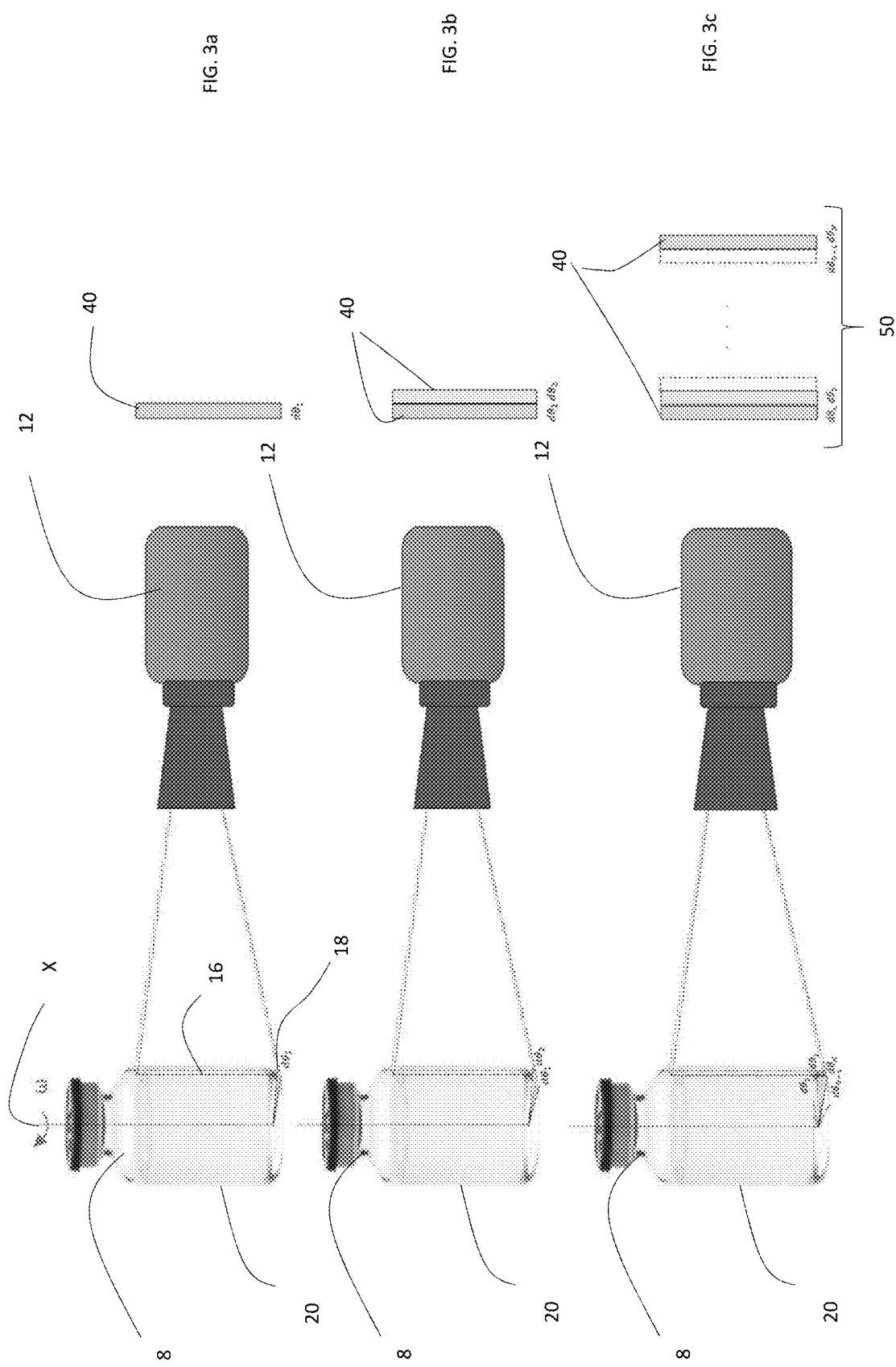

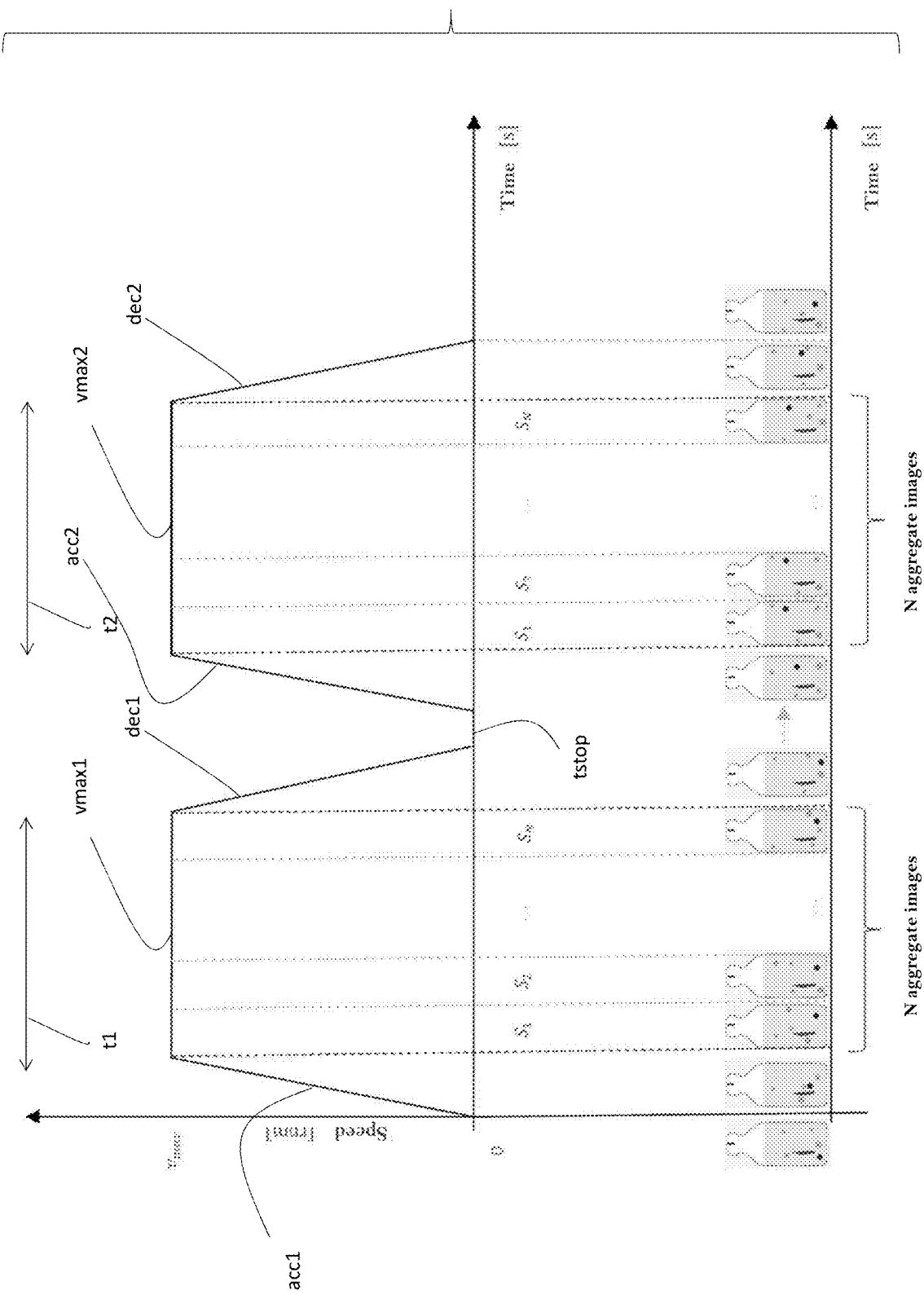

APPARATUS AND METHOD FOR INSPECTING CONTAINERS WHICH ARE AT LEAST PARTIALLY TRANSPARENT TO A PREDETERMINED ELECTROMAGNETIC RADIATION

CROSS REFERENCES

This application claims priority to Italian Application No. 102021000010790 filed on Apr. 28, 2021, the disclosure of which is expressly incorporated by reference herein in its entirety.

TECHNICAL FIELD

The present invention relates to an apparatus and a method for inspecting containers, which are at least partially transparent, by using a camera.

BACKGROUND

In the medical sector, but not only, it is essential to analyze medical substance containers in order to detect the presence of any impurities inside the container itself. If impurities are present, in fact, the container must be discarded because it is not acceptable that the medical substance can contain any kind of pollutant.

The systems employed in the art are of an optical type and make use of cameras that scan each container in order to detect any contaminants.

Known optical systems generally detect the presence of a contaminant/impurity by examining the images that are produced by the cameras. An approach used by the Applicant himself is, for example, of the "spin and stop" type, i.e. before the container arrives in front of the particle analysis camera, the container is rotated about its own axis. The container is then stopped, the liquid inside continues to move by inertia and the camera detects the contaminant in the liquid as it continues its movement, while the rest of the container is stationary.

However, this system is not effective if bubbles are present in the liquid: the bubbles will move like the contaminant even when the container is stopped, and therefore the above-mentioned "spin and stop" approach allows to identify if "something is present in the liquid" inside the container, but not if something is an internal contaminant or a bubble.

Therefore, when liquids that can form bubbles are present, the analysis of the containers containing such liquid for searching contaminants generates a high number of false positives, leading either to an excessive unjustified discard of containers, or to a double-check of discarded containers because in some the contaminants are actually absent.

It is desired to make available a method and an apparatus for inspecting at least partially transparent cylindrical containers which is adapted to distinguish, at least in part, whether contaminants are present in the liquid present in the container, differentiating them from any bubbles that may form in the liquid.

SUMMARY OF THE DISCLOSURE

According to one aspect, the invention relates to an apparatus for inspecting containers which are at least partially transparent to a predetermined electromagnetic radiation and which contain a liquid which is at least partially transparent to the predetermined electromagnetic radiation, the containers comprising at least one portion having radial symmetry about an axis of symmetry, said apparatus comprising:

a rotation device which is adapted to rotate the container about the axis of symmetry;

a camera which is positioned in such a manner that the container is located in the field of view thereof, said camera being sensitive to said predetermined electromagnetic radiation;

a processing unit which is adapted to control the rotation device and the camera, the processing unit being programmed:

to control the rotation device so as to move the container at a first angular speed and to keep the first angular speed constant for a first time period;

to control the camera so that it acquires during the rotation at the first constant angular speed at least a first and a second series of images, each image of the first or second series being an image of a portion of the container and each series of images representing the portion of the container in a rotation thereof through 360°;

to identify in the first and second series of images defective areas, each defective area having at least one characteristic which is different from the characteristics of the areas adjacent thereto, generating a first and a second map of the defective areas, each map comprising the position and the characteristics of the defective areas, identical positions in the first map and in the second map identifying the same position in the container;

to compare the position of the defective areas of the first and the second maps;

to establish that first impurities are present in the container or in the liquid contained in the container if a defective area is present in a position in the first map and a defective area is present in a region surrounding the same position in the second map.

According to a further aspect, the invention relates to a method for inspecting containers, comprising the steps of:

providing a container which is at least partially transparent to a predetermined electromagnetic radiation and which contains a liquid which is at least partially transparent to the predetermined electromagnetic radiation, the container comprising at least one portion having radial symmetry about an axis of symmetry;

rotating the container at a first angular speed and keeping said first angular speed constant for a first time period;

acquiring during the rotation at the first constant angular speed at least a first and a second sequence of images, each image of the first and second sequences being an image of a portion of the container and each sequence of images representing the portion of the container in a rotation thereof through 360°;

identifying in the first and second sequences of images defective areas, each defective area having at least one characteristic which is different from the characteristics of the areas adjacent thereto, generating a first and a second map of the defective areas, each map comprising the position and the characteristics of the defective areas, identical positions in the first map and in the second map identifying the same position in the container;

comparing the position of the defective areas of the first and the second maps;

establishing that first impurities are present in the container or in the liquid contained in the container if a defective area is present in a position in the first map and a defective area is present in a region surrounding the same position in the second map.

In the present invention, containers are inspected, preferably but not exclusively for medical use. The containers may, for example, be vials, bottles or ampoules. The containers comprise a hollow body that defines a side wall. They may also comprise a cap to close the hollow body, a cap that can be removed when access to the internal liquid is required. Alternatively or additionally, the cap can be pierced with a syringe. The side wall is at least for a portion thereof partially transparent to a predetermined electromagnetic radiation. The side wall is preferably transparent to a predetermined electromagnetic radiation. Thus, "container which is partially transparent or is transparent" means a container having at least a portion of the side wall which is at least partially transparent or transparent.

A liquid is contained inside the hollow body. The liquid is also at least partially transparent to the predetermined electromagnetic radiation. Preferably, the liquid is transparent to the predetermined electromagnetic radiation.

The liquid, for example, may be a medicament or distilled water to be combined with a medicament. The liquid may have different densities, it may be more or less viscous. The limit density is the one by which the liquid, when the container containing it is rotated, does not move relative to the container itself. Particularity of the liquid is its propensity to form bubbles. Bubbles are "little volumes" of air that remain trapped inside the liquid and are surrounded by it.

It should be noted that the containers are transparent, so that the transparent or semi-transparent liquid contained therein can be viewed from the outside. Thus the containers are preferably made of glass or plastic, such as for example plexiglass, or a copolymer of the cyclic olefin copolymer (COC) type.

Additionally, the containers have one portion having radial symmetry. Preferably, with respect to an axis of symmetry which will be referred to hereinafter as the axis X, the hollow body comprises a rotation solid about this axis. For example, the rotation solid may be a cylinder. However, other solids with radial symmetry can be used. It is not necessary for the whole container to have radial symmetry, it is sufficient that a part large enough to contain all the liquid contained in the container has such a radial symmetry.

The inspection is carried out by means of an apparatus and/or a method according to the invention. The object of the invention is to identify defects of the container and to distinguish the bubbles from other existing defects, at least in a fraction of the cases.

For the container to be inspected, it is rotated about its axis of symmetry (radial). The container can be rotated in various ways, for example, in a manner depending on its size and/or weight. For example, the container is rotated by a rotation device, part of the apparatus of the invention, which may comprise a support, on which the container is placed. The support is then rotated. The rotation, for example, is controlled and actuated by a motor. The rotation device may comprise a grip fitted with motor means for rotating it about the axis of symmetry. Preferably, the rotation device is positioned in such a way that it does not impede the vision by a camera (as detailed below) and therefore the check of possible defects in the container. For this purpose, rotation devices are preferred which grasp or otherwise drag the containers in rotation from their support base. There are a multitude of gripping devices/methodologies suitable for this purpose. For example, it is possible to grip the container bottom-head or with grippers at the neck of the container itself, etc.). The important thing is that these devices rotate the container about its axis of symmetry.

The search for any defects of the container is carried out using a camera. The camera is preferably a linear camera, but it can also be a 2D camera (in other words, capable of generating a two-dimensional image). The term "camera" also includes the photo camera. The camera is positioned in such a manner the container to be examined is located within the field of view thereof. It is not necessary that the entire container is in the field of view of the camera, it is sufficient that only a "portion" of the part with radial symmetry of the container is located in the field of view of the camera. The camera may for example be facing the container, in particular the side wall thereof, or the camera may also be oriented differently and one or more mirrors may ensure that the container is still in the field of view of the camera.

The camera is sensitive to electromagnetic radiation for which the side wall of the container and the liquid are transparent. Preferably, the electromagnetic radiation is an electromagnetic radiation in the range of visible, i.e. a radiation whose wavelength is between 390 nm and 700 nm. The electromagnetic radiation can also be included in the near-infrared (IR) spectrum; that is, a radiation whose wavelength is between 700 nm and 1 mm. Saying that a camera is sensitive to electromagnetic radiation means that the camera comprises at least one sensor that is sensitive to such radiation. The sensor may be for example a CCD or CMOS sensor.

When the container is positioned on the rotation device, it is rotated about its axis of symmetry. The control for rotating the container can for example be provided by a processing unit that controls both the rotation device and the camera.

The container then undergoes a first acceleration to move from a stopped state to a first predetermined angular speed. The first predetermined angular speed can be set, for example, via the processing unit. The predetermined angular speed is variable and depends on the type of container, the type of liquid contained therein and the type of impurity expected inside the container. Preferably the predetermined angular speed, for impurities such as glass, metal, rubber, plastic, fibres for example plastic fibres (in particular polyester or fibres used in making clothes), hair or the like, is between 200 rpm and 10000 rpm, more preferably between 500 rpm and 5000 rpm. For example, the predetermined angular speed may be 2500 rpm.

Thus, the container undergoes a first acceleration step from the stopped condition to the rotation condition at the first predetermined angular speed. The acceleration step can last for example from 50 milliseconds to 2 seconds, more preferably 200-700 milliseconds. The duration of the acceleration also depends on the size of the container (in particular on the radius thereof if the container has cylindrical symmetry), on the weight of the liquid contained, on the volume of the liquid contained and on the characteristics of the liquid contained in the container.

The predetermined angular speed is kept substantially constant for a first time period. During this first time period, the camera is activated, for example via the processing unit, so that at angular intervals, preferably at constant angular intervals, it acquires images of the portion of the container that is located in the field of view thereof or in any case of a selected portion of the container. Additionally, the camera remains active, i.e. it continues to acquire images, for at least a first and a second complete rotation of the container about its own axis of symmetry. The first time period must be long enough to allow the camera to acquire images of the portion of the container with radial symmetry for a first rotation and a second complete rotation through 360° of the container.

The first time period is continuous (it is a single period). The first angular speed is kept constant throughout the first time period without any interruptions being present such as accelerations, decelerations or stopping.

The camera can acquire images of the container even when the container is rotating not at the first constant angular speed, however these images are not part of the subsequent processing.

In each first or second rotation, the camera acquires M images. Preferably, an image is acquired every angular interval $\Delta\theta$. Preferably the angular resolution is at least 0.02 radians, more preferably at least 0.01 radians. The resolution can range from 100 µm/pixel to 1 µm/pixel, preferably 10 µm/pixel. In the images, since the development of the side surface of the container is achieved in a rotation through 360°, it will be $2*\pi*r$ where r is the radius of the container. In order to have a resolution of 10 µm, each angular interval $\Delta\theta$ (see definition of AO below) is preferably equal to:

$$2\pi/(2*\pi*r)/10 \text{ µm radians.}$$

In other words, the development $2\pi r$ is divided into a number N of 10 µm intervals. This number N will also be the number of intervals into which the round angle 360° (or $2\pi$) is preferably divided.

Each image of the M images is for example a column of pixels (a single base pixel) in the case of a linear camera or a frame of pixels in the case of a two-dimensional camera. Thus each image can be viewed either as a grid having as base 1 only pixel and as height P pixels, or as an array of dimensions P×Q. The image is substantially a raster image and each element of the raster, called pixel, is associated with a specific colour or greyscale.

A greyscale image is an image in which each pixel takes on values in a range. Typical values are [0, 63], [0, 255], [0, 1023], 6, 8, 10 bits per pixel, respectively.

The colour can be defined using two techniques: if the image contains only a few colours (maximum 256), a list of the colours to be used is generated and the index pointing to the specific pixel colour is inserted into the raster; if the image contains many colours, the single pixel does not define the index with which to point to a colour palette, but directly the colour. The colour is defined, for example, as a combination of three components: blue, red, green (RGB system).

The M images acquired in the first rotation and the M images acquired in the second rotation form a first and a second series of images. These images are preferably associated with each other. The association is preferably made by the processing unit. In the association, an aggregate image is generated for each series of M images. Thus, the association of the M images of the first series generates a first aggregate image, and the association of the images of the second series generates a second aggregate image. The association takes place seamlessly in order to obtain an aggregate image of the development of the container, in other words, the aggregate image represents the external side wall of the container throughout its all 360° development. The camera together with the processing unit produce a continuous development of the side wall of the container, formed by assembling M images of "slices" of the same acquired at an angular distance from each other which is equal to AO.

In the case of a linear camera, the images are simply combined with each other in succession without any other operation. In the case of a 2D camera it is necessary, with suitable software known in the field, to make an image overlay so that no duplicate portions of the external side wall of the container appear in the aggregate image.

By way of example, for a linear camera and a container with cylindrical symmetry with a diameter of 24 mm, the number of images M is equal to 5000.

The linear camera acquires lines at constant angular intervals $d\theta$ while the container being examined rotates about its own axis. For example, by using a rotary encoder connected to the motor responsible for the rotation of the container, the camera produces a continuous development of the side wall of the container. The encoder can be controlled by the processing unit.

Each pixel of the aggregate image uniquely corresponds to a single point on the side wall of the container (except for the line of the image end points, as known). Therefore, each one-pixel coordinate of the aggregate image corresponds to a precise point in the side wall of the container. Consequently, a position of the aggregate image corresponds to a position on the side wall of the container (or at least of the part of the side wall of the container that has been detected by the M images of the camera).

For the invention, it is sufficient that a first series of images and a second series of images are acquired, each series of images representing a development of the external surface of the container in a complete rotation thereof through 360° about the axis of symmetry. However, a number N of series of images may be acquired during the first time period, that is all acquired while the container is rotating at the same first constant angular speed, without any acceleration or deceleration being present (or accelerations and decelerations which are irrelevant for the present discussion and are caused by the existing tolerances and levels of accuracy in the machinery).

The number N of series of images, and therefore the number N of aggregate images, is preferably between 2 and 10. At least two series of images are required for the invention. If N>10, no advantages in greater accuracy are generally obtained, only a waste of time and resources.

When a container is rotated about its axis of symmetry at the first constant angular speed $\omega$, upon reaching the dynamic balance, the liquid contained inside rotates rigidly together with the container (i.e. the relative motion between container and liquid is lost) and the free surface assumes the concave shape of a rotational paraboloid.

The phenomenon of shape variation of the rotating liquid is attributable to the effects of the internal friction forces acting among fluid elements and to the friction between the liquid and the container walls in the time period between the beginning of the rotation and the achievement of the dynamic balance condition. The internal friction force depends on several factors including fluid viscosity, contact area and relative speed among fluid elements.

At the beginning of the rotation, the liquid elements in contact with the surface of the external side wall of the container come into movement, in relative motion. Since a dynamic balance condition has not yet been achieved, there is not a centripetal force that is sufficient to keep them in a circular orbit and the motion of the outermost elements drags the innermost elements towards the walls by internal friction. Since the angular speed is constant, the relative speeds cancel out in the end and the dynamic balance is achieved with the parabolic conformation.

In a dynamic balance condition, each infinitesimal element of liquid, with mass $dm=\rho dV$, where $\rho$ and $dV$ are respectively the density and the volume of the element, describes a circular orbit and is subjected to the following forces: the weight force $\vec{F}_p$ which is a volume force with a vertical downward direction, proportional to the mass dm of the element and of modulus ρdVg, where g indicates the gravity acceleration; and pressure forces: surface forces dF=pdS, directly proportional to the area of the infinitesimal surface dS on which the pressure p is exerted. The pressure forces act orthogonally to all the surfaces of the infinitesimal element under consideration.

In an inertial reference system, the resulting force between the volume forces $\vec{F}_v$ and the surface forces $\vec{F}_s$ acting on an infinitesimal element of liquid describing a circular orbit around the axis of the container corresponds to a centripetal force $\vec{F}_c$.

Along the vertical direction, i.e. along a reference axis that is parallel to the axis of symmetry of the container when the latter is resting on the base, the volume and the surface forces are in equilibrium and therefore the resultant of the surface forces exerted by the fluid on the infinitesimal element of fluid is equal and opposite to the weight force of the volume of fluid displaced dV and is called Archimedes thrust.

In the radial direction no volume forces act and the variation of the pressure forces along this direction is responsible for the centripetal force $\vec{F}_c$ that keeps the element dm in a circular orbit about the axis of symmetry that is also the axis of rotation.

The origin of the centripetal force necessary for the rotation of the infinitesimal element of liquid derives precisely from the fact that the little volume is subject to a variable pressure along the radial direction.

If a corpuscle of density ρ'≠ρ and mass ρ'V is suspended in the liquid, the action of the pressure exerted by the surrounding liquid is always the same, but the centripetal force may not be sufficient to keep the corpuscle on the circular orbit of radius r. In particular:

If the density of the particle or impurity is lower than the density of the liquid, i.e. if the density of the corpuscle is lower than that of the liquid, the corpuscle tends to move towards the axis of rotation. The category of corpuscles with a lower density than the fluid contained in the container includes air bubbles that can form inside a liquid.

If, on the other hand, the density of the corpuscle is greater than that of the air, the corpuscle tends to move away from the axis of rotation and to move towards the external side wall of the container. If the resulting force to which the corpuscle is subjected is not sufficient to counteract the force of viscous friction, the corpuscle begins to fall towards the bottom since the Archimedes thrust received is not sufficient to balance the weight force of the corpuscle. Otherwise, if the resulting force is greater than the viscous friction exerted by the fluid, the corpuscle continues to move away from the axis of rotation until it reaches the external side wall of the container. At this point, if the rotation speed is such that the weight force of the corpuscle and the static friction force between the corpuscle and the wall are balanced, the corpuscle remains attached to the wall and continues to rotate integral with the container.

From what has been presented above, the defects that may be present in the container may have a different behaviour when the liquid inside the container is rotated about the axis of symmetry. Once the dynamic balance condition has been reached, the bubbles, which are "light" as they contain air, move towards the axis of rotation, while the impurities, which are assumed to have a higher density, head towards the side wall of the container where they stop and do not move, remaining attached to the wall.

In other words, the difference between impurities and bubbles lies in the behaviour during the rotation steps. At some point during rotation, there is no longer any relative movement between container and impurity (because it is already adhering to the side wall). At a steady state, the liquid is still moving with respect to the container (in fact, the bubbles that are not moved to the external wall remain floating in the liquid). The latter has a relative motion with respect to the container due to its own inertia and this "decoupling" between the liquid and the side wall causes the bubbles to have a relative movement to the side wall, unlike impurities. This "decoupling" due to the inertia of the liquid lasts a period of time that is dependent on the viscosity thereof. Therefore the interval useful for this step, i.e. the step in which the "heavy" impurity is attached to the wall and the "light" bubble still moves, is: from when the impurity adheres to the wall (relative speed of the impurity with respect to the side wall approximately equal to zero) to before the liquid moves integrally with the wall. In the interval in which the impurities are adhering to the side wall (but before the liquid is integral with the side wall), image acquisition begins and ends before the liquid itself assumes the same speed as the container. The time period depends on the size of the container and the viscosity of the liquid.

Under these conditions, therefore, the impurities maintain a trajectory integral with the container and, consequently, maintain unchanged their position on the side wall of the container during rotation in the first time period. Bubbles tend to move within the liquid during all the rotation steps even at constant angular speed. In fact, as they have a lower density than the liquid in which they are immersed, the radial forces to which they are subjected during the rotation of the container are not sufficient to keep them in a circular orbit towards the walls of the container.

This different behaviour can be highlighted by comparing the first and second series of images with each other. For example, the first and second aggregate images are compared to each other.

The two series of images are taken when the container rotates at the first constant angular speed. It is therefore assumed that the value of the constant angular speed is such that the impurities have been pushed against the side wall of the container. It is also assumed that the acceleration time has been sufficient to ensure that the fluid is in "static" conditions, i.e. that the absence of relative rotation between the container and the impurities has been reached, i.e. that the impurities are now attached to the side wall of the container.

In the first time period at the first constant angular speed vmax in which the first and second aggregate images, or more generally the N aggregate images that are nothing else than N developments of the side wall of the container, are acquired, the rotation speed of the container about its own axis must be such that the impurities, by effect of the centrifugal force, are pushed close to the internal wall of the container and maintain the position throughout the first time period.

On each series of images, or aggregate image, areas are identified that may represent defects, whether impurities or bubbles. The defects are distinguishable from the simple liquid in that in the image the pixels identifying the defect have at least one characteristic that differs from the characteristics of the pixels surrounding them. In general, in the aggregate images or series of images, the image pixels have characteristics that are for the most part very similar since in the ideal case the liquid does not comprise any defect and therefore the vast majority of the pixels of the aggregate image assumes the characteristics of "image of the liquid" contained in the container, as visible through the side wall of the container itself. Thus, in the first or second aggregate image (or in the first or second series of images), a few pixels can generally be identified, usually clustered, which have at least one characteristic which is different from the characteristics of the pixels surrounding the pixel or the cluster. "Defective areas" are then identified in the first or second aggregate image (or in the first or second series of images), defined as those areas having pixels comprising a characteristic which is different from the characteristics of the pixels around them. The defective area instead includes pixels with substantially homogeneous characteristics.

As characteristics that can be compared, one or more of the following can be considered: intensity, colour. Thus, for example, a defective area is an area that has a different greyscale intensity compared to the intensity of the other areas (most) of the aggregate image.

The defective areas in the first and second aggregate images, or in the first and second series of images, have their position. For the position of the defective area to be determined, for example, the position of the centre of gravity thereof can be considered as the position of the area. Alternatively, the position of the defective area is given by the position of the centroid of the defective area. Alternatively, the position of a defective area is given by the position of all the pixels that make it up.

The position is given by the coordinates within the image (either one of the M images or the aggregate image). An image is, as mentioned, formed by an array of pixels, each of which has unique coordinates. Therefore, on the first and second aggregate images or first and second series of images, the defective areas are identified, with their characteristics and their position, generating a first and second map of the defective areas.

It is therefore possible to compare the map of the defective areas that were identified in the first aggregate image (or first series of images) and the map of the defective areas that were identified in the second aggregate image (or second series of images). For each defective area identified in the first aggregate image, there are two possibilities. The first possibility is that in the first aggregate image there is a first defective area in a first position and also that in the second image there is a first defective area in a first position which is the position corresponding to the first position of the first defective area in the first image. Corresponding position means that the coordinates at which the defective area is located in the first aggregate image are the same coordinates at which the defective area is located in the second aggregate image.

The associated images are in fact generated in such a manner that the same coordinates in the first and second aggregate images correspond to the same point in the side wall of the container.

Further, in order to say that the same defective area is present in both the first and the second aggregate image, it is not necessary that the two defective areas are in exactly the same position in the two aggregate images, i.e. that there is a defective area in exactly the same corresponding position in both the first and the second image, but a region around the position is also considered. That is, once the position of a defective area in the first image has been identified, it is checked whether there is a defective area in the second image at the corresponding position and in a region around it.

A region can be for example in a range in each direction of 10 pixels around the corresponding position. Preferably the range is less than or equal to 10 pixels. More preferably, the range is less than or equal to 5 pixels. The range can also be changed and established based on the resolution of the images and on the typical size of the impurities in a given liquid. Special image processing software can define a region around a defective area and make a quick comparison between the first and second associated image to check that a same defect is located in both images in the same position or in any case within a region around the same position.

Preferably, in an optional step of the invention, it is further checked that substantially the same defect is present in both the first and the second associated image. This can be done, for example, if the pixels are in the greyscale, with a thresholding operator. For example, a threshold value is imposed for the grey (or colour) level of the pixels. A special software analyzes the pixels of the associated first and second image one by one, if the grey level of a certain pixel exceeds the threshold value then this pixel is considered to be defective. The same threshold value must also be exceeded in the second image to be sure that it is the same defect.

If more than 2 aggregate images are produced, e.g. N associated images, this comparison is made among all the aggregate images. Defective areas are identified in all N aggregate images. It is then assessed whether the defective areas present in the first aggregate image are present in the same position also in the second aggregate image, and therefore in the third aggregate image . . . until the n-th aggregate image. Each comparison of the position between an aggregate image and the next one is always made taking into account a region around the position of the defective area, i.e. the same defective area is located in image j and in image j+1 if in image j+1 the defect is located in a region around the same position as the position of the defective area in image j.

In the case of N aggregate images, it is not necessary for the defective area to be located in all N aggregate images. It can for example be considered a persistence index, which if it exceeds a certain threshold in any case the defective area is considered to be present in all N aggregate images. In other words, it is sufficient that the defective area is present "in most of the cases".

Therefore, by comparing the aggregate images, it is established which are the "persistent defective areas", or first impurities, i.e. those defective areas that are found in the same position in all the aggregate images.

These persistent defective areas identify impurities and not bubbles.

Therefore, by means of the method and the apparatus of the invention it is possible to determine whether there is actually an impurity or a bubble in the liquid contained in the container. In fact, the "persistent" defective areas, i.e. the defective areas found in both the first and second aggregate images (or first and second series of images) are actually impurities since, as seen, they are induced, through the rotation of the container, to lean against the side wall of the container and remain attached thereto. The bubbles, on the other hand, which appear as defective areas possibly in only one of the two images, are not persistent, as they are "light" and in rotation they do not adhere to the side wall and do not move at the same speed as the side wall but have their own inertia. In other words, they are "at the mercy" of the movements of the liquid in the container.

With a simple comparison of images, it is therefore possible to determine whether there are impurities and to distinguish them from the bubbles, so that an excessive number of containers is not discarded because a bubble was mistakenly considered to be an impurity.

Preferably, the camera is sensitive to electromagnetic radiation in the range of visible or infrared. These two radiations are the most suitable for inspection as they do not involve any particular danger or safety protocols.

Preferably, the apparatus comprises a light source of the predetermined electromagnetic radiation, the light source being positioned at the opposite side of the container with respect to the camera. In order to obtain images under the same lighting conditions, so as to minimise sources of error, a light source is positioned so as to back-light the container.

Preferably, the camera is a linear camera and each of the first or second series of images comprises a plurality of linear images acquired at constant angular intervals. Preferably, the processing unit controls the rotation device and the camera in such a manner that there is a synchronism such that each angular interval corresponds to a linear image. The aggregate image is nothing more than the association of linear images taken at constant angular intervals.

Preferably, the processing unit is further programmed:
to control the rotation device so as to stop the rotation of the container;
to control the rotation device so as to rotate the container again, at a second angular speed, and to keep the second angular speed constant for a second time period;
to control the camera until it acquires during the rotation at the second constant angular speed at least a third and a fourth series of images, each image of the third and fourth series of images being an image of a portion of the container and each third and fourth series of images representing the portion of the container in a rotation thereof through 360°;
to define in the third and fourth sequences of images defective areas, each defective area having at least one characteristic which is different from the characteristics of the areas adjacent thereto, generating a third and a fourth map of the defective areas, each map comprising the position and the characteristics of the defective areas, identical positions in the third map and in the fourth map identifying the same position in the container;
to compare the position of the defective areas of the third and the fourth maps;
to establish that second impurities are present in the container or in the liquid contained in the container if a defective area is present in a position in the third map and a defective area is present in a region surrounding the same position in the fourth map;
to compare the position of the first impurities and the second impurities and establishing that an impurity is present in the liquid contained in the container when, in the position of one of the first impurities in the first or in the second map, no second impurity in a region surrounding the same position in the third or in the fourth map corresponds.

Preferably, the method comprises the steps of:
stopping the rotation of the container;
rotating the container again at a second angular speed and keeping the second angular speed constant for a second time period;
acquiring during the rotation at the second constant angular speed at least a third and a fourth series of images, each image of the third and fourth series being an image of a portion of the container and each of the third and fourth series of images representing the portion of the container in a rotation thereof through 360°;
identifying in the third and fourth series of images defective areas, each defective area having at least one characteristic which is different from the characteristics of the areas adjacent thereto, generating a third and a fourth map of the defective areas, each map comprising the position and the characteristics of the defective areas, identical positions in the third map and in the fourth map identifying the same position in the container;
comparing the position of the defective areas of the third and the fourth maps;
establishing that second impurities are present in the container or in the liquid contained in the container if a defective area is present in a position in the third map and a defective area is present in a region surrounding the same position in the fourth map;
comparing the position of the first impurities and the second impurities and establishing that an impurity is present in the liquid contained in the container when, in the position of one of the first impurities in the first or in the second map, no second impurity in a region surrounding the same position in the third or in the fourth map corresponds.

In order to distinguish whether the first impurities are impurities present inside or outside the liquid, the present invention provides an optional step. In fact, if impurities are present inside the liquid, the container must most likely be discarded. If, however, impurities are present outside, the container can be kept. External impurities may also include defects of the container itself, such as cracks or bubbles of the material forming the side wall of the container. In order to differentiate between the two types of impurities, the container that was rotating at the first constant angular speed for a first time period is stopped. After a certain period of stoppage, the container is rotated again. The container is moved at a second angular speed which is kept constant for a second time period. The second rotation speed of the container about its own axis of symmetry must be such that the internal impurities, by effect of the centrifugal force, are pushed close to the internal wall of the container and maintain the position against the side wall throughout the second time period. Preferably, the first angular speed is equal to the second angular speed. Preferably, the first time period has a duration equal to the second time period. During this second time period, the camera is activated, for example via the processing unit, so that at angular intervals, preferably at constant angular intervals, it acquires images of the portion of the container that is located in the field of view thereof or in any case of a selected portion of the container. Additionally, the camera remains active, i.e. it continues to acquire images, for at least a first and a second complete rotation of the container about its own axis of symmetry. The second time period must be long enough to allow the camera to acquire images of the portion of the container with radial symmetry for a first rotation and a second complete rotation through 360° of the container.

In each first or second rotation, the camera acquires M images. These images are acquired in the same manner as in the first time period.

The M images acquired in the first rotation and the M images acquired in the second rotation form a third and a fourth series of images. These images are preferably associated with each other. The association is preferably made by the processing unit. In the association, an aggregate image is generated for each series of M images. Thus, the association of the M images of the third series generates a third aggregate image, and the association of the images of the fourth series generates a fourth aggregate image. The association takes place like in the case of the first and second aggregate image.

Preferably, if N aggregate images are acquired in the first time period, N aggregate images are also acquired in the second time period.

Each pixel of the third and fourth aggregate image uniquely corresponds to a single point on the side wall of the container (except for the line of the image end points, as known). Therefore, each one-pixel coordinate of the third and fourth aggregate image corresponds to a precise point in the side wall of the container. Identical coordinates in the first, second, third or fourth aggregate image correspond to the same point on the side wall of the container.

On the third and fourth aggregate images, areas are identified that may represent defects, whether impurities or bubbles. The identification of the areas is done in the same manner as described for the identification of the areas in the first and second aggregate images. "Defective areas" are then identified in the third and fourth aggregate image.

The defective areas in the third and fourth aggregate image have their position. Therefore, on the third and fourth aggregate images, the defective areas are identified, with their characteristics and their position, forming a third and fourth map of the defective areas.

It is therefore possible to compare the map of the defective areas that were identified in the third aggregate image and the map of the defective areas that were identified in the fourth aggregate image, exactly as it was done for the first and second map of the defective areas.

Therefore, by comparing the third and fourth aggregate image, it is established which are the "persistent defective areas", or second impurities, i.e. those defective areas that are found in the same position in all the aggregate images. This comparison takes place in exactly the same way like in the case of the first and second aggregate images.

There is thus available a plurality of "first persistent defective areas", or first impurities, which were identified by analyzing the aggregate images detected during rotation in the first time period, and a plurality of "second persistent defective areas", or second impurities, which were identified by analyzing the aggregate images detected during rotation in the second time period. As the container underwent a deceleration, a stop, and a new acceleration between the first and second time period, the impurities present inside the liquid in the container, which during rotation at the first angular speed were firmly "attached" to the side wall, have detached therefrom. When the container is put back into motion, the impurities are pushed again against the side wall, but in a position which is different from the position in which they were during rotation at the first angular speed. Therefore, by comparing now the position of the first impurities and the position of the second impurities, if for each first impurity there is no equivalent in the same position that defines a second impurity, then this means that the impurity has moved and that it is therefore an impurity inside the container. If, on the other hand, a first impurity corresponds in the same position to a second impurity, it means that this impurity is not subject to displacements in the case of accelerations or decelerations of the liquid and therefore it is located on the external surface of the container or it is a defect of the side wall itself.

Preferably the method comprises, or the processing unit is further programmed:

to determine a differential map of the position of the first impurities;
to determine a differential map of the position of the second impurities;
to compare the position of the first and second impurities and establishing that an impurity is present in the liquid contained in the container when in the position of one of the first impurities in the first differential map, no second impurity in a region surrounding the same position of the second differential map corresponds.

The differential map is nothing more than a map that comprises the persistent defective areas and their position. The first differential map comprises the first impurities, with their characteristics and position, as obtained from the analysis of the aggregate images obtained in the first time period. The second differential map comprises the second impurities, with their characteristics and position, as obtained from the analysis of the aggregate images obtained in the second time period.

Preferably, the density of the liquid contained in the container is less than 2000 centipoise. The liquid contained in the container must be fluid enough to enter into relative rotation with respect to the side wall of the container.

Preferably, the method comprises, between the step of stopping the rotation of the container; and the step of rotating the container again at a second angular speed; the step of:
keeping the container stopped for a third time period.

In order to make sure that the impurities after the first time period "detach" from the internal surface of the container, it is stopped and only after a "stop" time period the rotation is resumed.

Preferably, the first or second angular speed is between 200 rpm and 10000 rpm. This angular speed, in commonly used containers, makes it possible to achieve the required dynamic balance and move common impurities such as hair, glass, metal, rubber, etc. towards the container wall.

Preferably, the method comprises the step of back-lighting the container with said predetermined electromagnetic radiation. This minimises errors due to changes in camera lighting.

Preferably the method includes the step of:
acquiring during the rotation at the first or second angular speed (vmax1, vmax2) N series of images, with 2≤N≤10, each series of images representing the portion of the container in a rotation thereof through 360°.

2≤N≤10 allows obtaining a good accuracy in detecting impurities without making the inspection excessively slow.

Preferably, the step of identifying defective areas in the first and second series of images includes analyzing the pixels which form the first and second series of images and identifying as a defective area a cluster of pixels having characteristics different from the pixels adjacent to the cluster. Impurities generally form in the image an area of a few pixels.

BRIEF DESCRIPTION OF THE DRAWINGS

Further features and advantages of the present invention are further detailed in the following description of its preferred and non-limiting examples of embodiments, wherein:

FIGS. 3a-3c represent schematic top views of an inspection apparatus in accordance with the present invention, in subsequent inspection steps;

FIG. 4 represents a graph of the rotation speed as a function of time of the container according to a step of the method of the invention;

DETAILED DESCRIPTION

With reference to the aforementioned figures, an apparatus for inspecting containers 8 according to the present invention is globally indicated with 4.

The containers 8 at least for a part thereof are transparent or partially transparent to a predetermined electromagnetic radiation, for example in the visible range, and contain a liquid which is transparent or at least partially transparent to the same electromagnetic radiation. The liquid is preferably for medical applications.

The containers 8 are at least for a part thereof transparent or partially transparent to an electromagnetic radiation so as to allow the view from the outside of the liquid contained therein.

Figure 2:
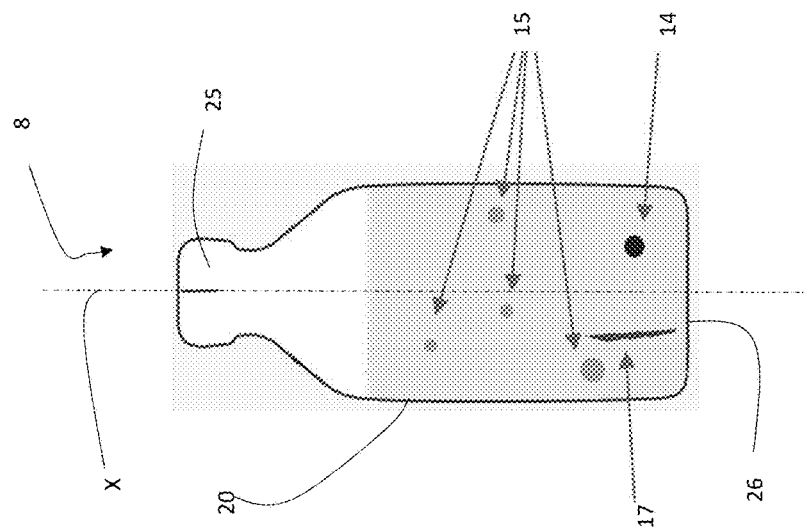
FIG. 2 represents a side view of a container containing a liquid inspected in accordance with the present invention.
Figure 1:
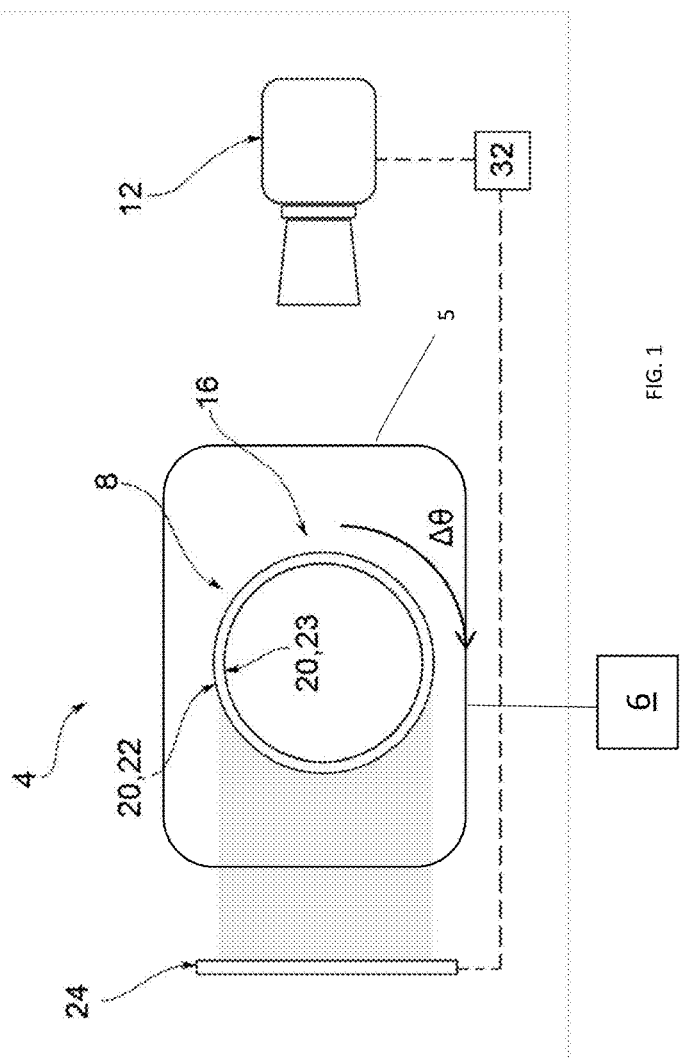
FIG. 1 represents a schematic top view of an apparatus for inspecting containers containing a liquid and inspected in accordance with an embodiment of the present invention.

In the preferred example of the figures, the containers 8, as better visible in FIG. 2, comprise a side wall 20, which is transparent or partially transparent to the electromagnetic radiation, a bottom wall 26 and a cap 25. The cap 25, for example, is not transparent to electromagnetic radiation. The liquid is contained in the part of the container 8 bounded by the side wall 20 and by the bottom wall 26. Side and bottom wall are preferably made together as one piece. Side wall 20 and bottom wall are preferably made of glass. The side wall 20 in turn defines an internal surface 23, in contact with the liquid, and an external surface 22 (better visible in FIG. 1).

Furthermore, the containers 8 have an axis of radial symmetry X for at least a portion thereof. The container 8 of the example shown in the figures has a cylindrical symmetry; in other words, it is a solid of rotation about the axis of symmetry X.

The inspection apparatus 4 comprises a rotation device 5 for the container 8 adapted to support it and provided with motor means 6 (schematically indicated with a rectangle in FIG. 1) to rotate it around an axis of vertical rotation coinciding with the axis of cylindrical symmetry X of the container 8.

The apparatus 4 further comprises a camera 12 which is positioned in such a manner that with the field of view thereof it can frame and acquire images, for example in the form of pixels, of a portion 16 of the side wall 20 of the container 8. Preferably, the portion 16 is such that the extension thereof along the axis X includes the bottom wall 26 and ends at a height higher than the height defined by the level of the liquid inside the container 8. The camera 12 comprises special sensors sensitive to the electromagnetic radiation to which the liquid and the container are at least partially transparent.

Thanks to the fact that the container 8 comprises a side wall 20 that is transparent or partially transparent to the electromagnetic radiation to which the camera is sensitive, the camera 12 is able to acquire images not only of the side wall 20 of the container 8 but also of the content thereof (i.e. the liquid).

The aim of the present invention is to detect the presence of defects in the container and then to distinguish whether such defects (if any) are actually internal impurities 14 or bubbles 15 in the liquid.

Further, as shown in FIG. 2, in addition to the bubbles 15 and internal impurities 14 present in the liquid, the container 8 may also present external impurities/defects 17 on the external surface 22 of the side wall 20 of the container 8. The external defects 17 may be, for example, damage to the container (e.g. a crack) or external impurities present on the external surface 22. If the impurity is on the internal surface 23, then it will be in direct contact with the liquid contained in the container 8 which will preferably have to be discarded, whereas if the defect is on the external surface 22, the container can still be used.

The apparatus 4 preferably comprises a lighting device 24, arranged at the opposite side to the camera 12 with respect to the container 8, so as to back-light said container 8 with the electromagnetic radiation to which the camera is sensitive, at the opposite side to the camera 12. The lighting device 24 is, for example, a flat illuminator panel.

The apparatus 4 further comprises a processing unit 32 operatively connected to the rotation device 5 and to the camera 12.

According to the method of the invention, the processing unit 32 is programmed as follows. The rotation device 5 is controlled in rotation so as to rotate the container 8 around the axis of rotation and symmetry X until a constant and predetermined angular speed is reached.

FIG. 4 represents a graph of the angular speed of the container as a function of time. As can be seen in FIG. 4, the processing unit 32 controls the rotation device 5 to accelerate the container 1 with an acceleration acc1 until it reaches a predetermined angular speed vmax1 which is kept constant for a first time period t1. In this time period t1, the container 8 performs N complete rotations through 360° about the rotation axis X. In each of these N rotations, the processing unit 32 controls the activation of the camera 12 so as to acquire M images of said portion 16, for a predetermined number M of regular angular intervals 18 $\Delta\theta$, as depicted in FIG. 3a-3c.

The camera 12 is for example a linear camera and acquires linear images 40 at constant angular intervals, $d\theta_1 = d\theta_2 = \ldots = d\theta_M = \Delta\theta$, producing, for each rotation through 360° around the axis X of the container, a continuous development of the side surface 20 of the container, as detailed below. The camera 12 acquires M images in sequence, one image 40 every AO degrees, through the use of a rotary encoder connected to the motor means 6 that rotate the container.

The width of the angular intervals at which the linear camera 12 scans the development of the container 8 depends on the resolution to be obtained. A value for said angular intervals may be, by way of example, equal to 0.0012 radians.

By joining together all the linear M images 40 acquired by the camera 12, an aggregate image 50 is obtained, as displayed in FIG. 3c. The aggregate image 50 is therefore the development of the entire side wall 20 of the cylindrical container 8.

The process of FIGS. 3a-3c is repeated for all N rotations occurring in the first time period t1. As visible in FIG. 4, therefore, a first sequence of aggregate images 50 is generated. The first sequence is called $S_1, S_2 \ldots S_N$ where each $S_i$ with i=1, N is an aggregate image 50. N is, for example, equal to 5.

Again as shown in FIG. 4, during the acceleration step acc1, the camera can still acquire images, but they are not considered in the subsequent processing. The time the container 8 takes to reach the first predetermined angular speed vmax1 from a standstill is, for example, 500 milliseconds and is selected in such a manner that at the beginning of the time period t1 the liquid is no longer in relative motion with respect to the external wall of the container 8. Therefore, at the beginning of the first time period, the experimental conditions are such that the impurities 14 present internally to the container 8 and having a "high" density are brought into contact with the internal surface 22 of the side wall 20 and pushed towards it, thus substantially not moving during rotation, while the bubbles 15 move inside the liquid. In other words, in the first time period at constant angular speed vmax1 in which the developments $S_1, S_2 \ldots S_N$ are acquired, the rotation speed of the container 8 about its own axis of symmetry X must be such that the impurities 14, by effect of the centrifugal force, are pushed close to the internal surface 22 of the container 8 and keep the position.

Figure 5:
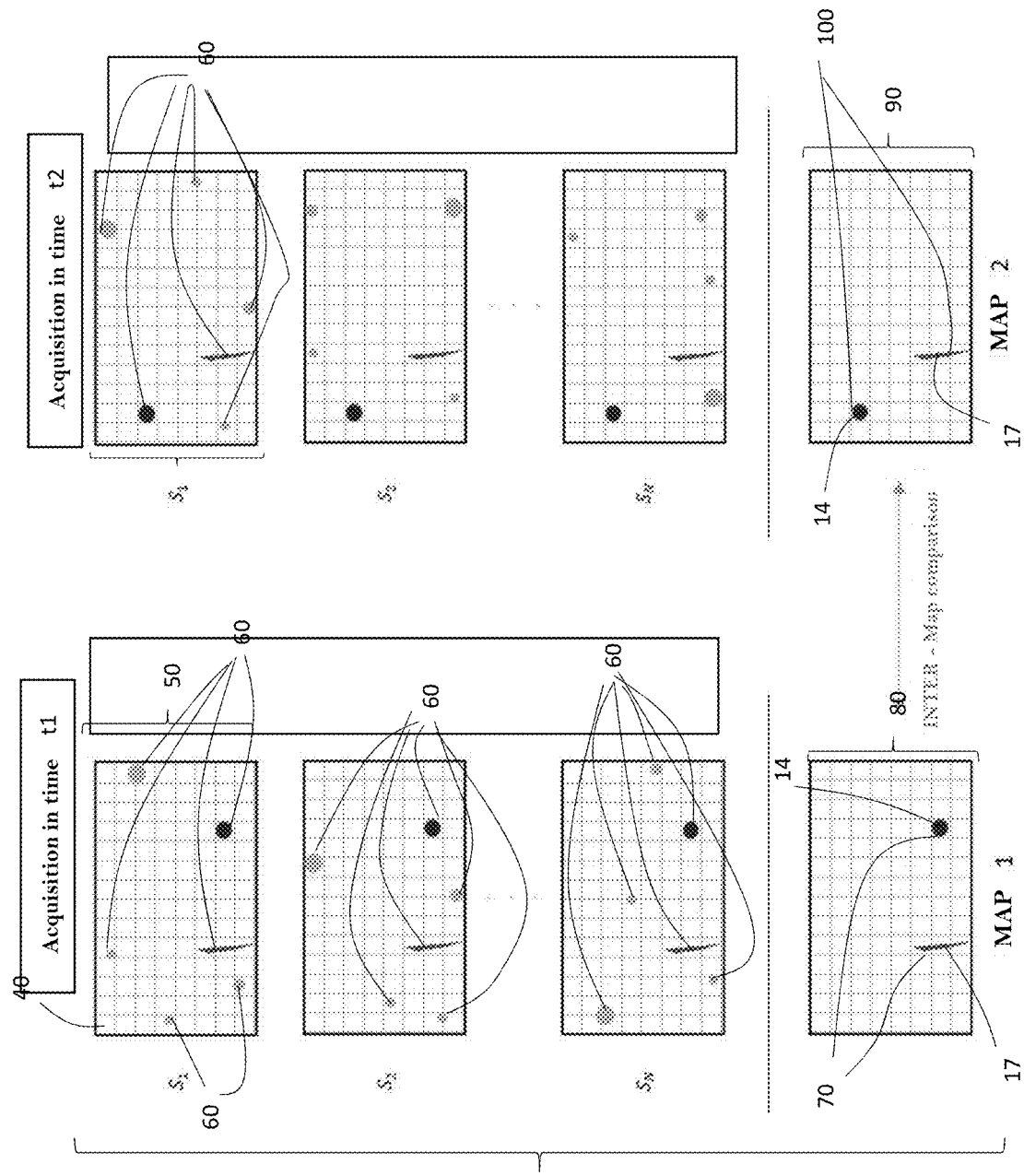
FIG. 5 represents a plurality of images and their analysis according to a step of the method of the present invention.

Each aggregate image 50 of the first sequence $S_1, S_2 \ldots S_N$ is then analyzed as described in FIG. 5. The pixels of each aggregate image 50 are examined and defective areas 60 are identified that have one or more characteristics which are different from the pixels of the areas surrounding them. In fact, it is conceivable that most of the pixels in the image 50 have uniform characteristics due to the fact that they represent a uniform image of the liquid contained in the container 8. Thus, there are likely to be relatively a few areas in which the pixels show characteristics with are different from the characteristics of the majority of the pixels of the aggregate image 50. These "different" areas are highlighted in each aggregate image 50 of the first sequence. The "different" characteristic for identifying the areas 60 may be, for example, the intensity of the colour. These areas in each aggregate image are referred to as defective areas 60. This operation, as visible in FIG. 5, is carried out for each aggregate image 50 of the first sequence. Therefore a "map of the defective areas" is generated on each aggregate image of the sequence, each defective area 60 having a precise position.

The defective areas may represent external defects 17 on the external surface 22 of the side wall 20, bubbles 15 in the liquid, or impurities within the container 14.

In order to differentiate the defective areas 60 and determine which are actually internal impurities and not bubbles, a comparison of all aggregate images 50 of the first sequence $S_1, S_2 \ldots S_N$ is then carried out using the processing unit 32. For each defective area 60 present in the first aggregate image $S_1$, it is checked whether in the second aggregate image $S_2$ there is a defective area in the same position, at least one region around it. In other words, once a defective area is found in the first aggregate image in a certain position, it is checked whether in the same corresponding position, or in a region around the corresponding position, a defective area is also found in the second aggregate image of the sequence.

In the case of N aggregate images a search is made to see whether in all N aggregate images there are defective areas in the same position or in a region around the same position.

For example, for each defective area 60, the position of the centre of gravity thereof is calculated and a search is made to see if in all N images there is a defective area in a 10-pixel region around the corresponding position of the centre of gravity.

In the case of N aggregate images, in order to determine that a defective area is present in all of them, it is not necessary that the defective area 60 is repeated exactly in all the aggregate images 50 of the first sequence $S_1, S_2 \ldots S_N$. For example, a persistence index is used. If there is a defective area in the first aggregate image, a search is made to see if there is a defective area in the same position (at least in a region around it) also in the second aggregate image. If this is true, a certain score is awarded. If this is not true, the score awarded is much lower. The same comparison and scoring is then carried out with the third image of the sequence and so on. All scores are then summed and if this sum exceeds a threshold value, then the defective area 60 is considered to be present in all the aggregate images 50 of the first sequence.

The "persistent" defective areas, i.e., those found in all the aggregate images of the first sequence, are considered impurities 70. In fact, the defective areas, if they are persistent, indicate the "permanence" of a defect in a certain position even during the rotation of the container. These impurities 70 may be both internal impurities 14 and external defects/impurities 17, however they may not be bubbles 15 as the bubbles change position between aggregate images. A first differential map 80 of the impurities 70 is then generated by comparing the defective areas 60 of all the aggregate images 50 of the first sequence.

If it is desired to distinguish internal impurities 14 from external impurities 17, the above-described process is repeated for an additional time period.

With reference again to FIG. 4, the processing unit 32 controls the rotation device 5 to decelerate the container 8 with a deceleration dec1. Preferably, the modulus of dec1 and acc1 is the same. The container 8 is then stopped, for example in 500 milliseconds. Preferably, the container 8 is kept stopped for a third time, tstop. For example, the time tstop is equal to 50 milliseconds.

The container 8 is then rotated again until a second predetermined angular velocity vmax2 is reached. Preferably, vmax1=vmax2. As can be seen in FIG. 4, the processing unit 32 controls the rotation device 5 to accelerate the container 8 with an acceleration acc2 until it reaches vmax2 which is kept constant for a second time period t2. Preferably acc1=acc2. In this time period t2, the container 8 performs N complete rotations through 360° around the axis of rotation X. The number of rotations N performed in the second time period t2 is preferably equal to the number N of rotations performed in the first time period t1. In each of these N rotations in the second time period t2, the processing unit 32 controls the activation of the camera 12 so as to acquire M images of said portion 16, for a predetermined number M of regular angular intervals 18 Δθ, as depicted in FIG. 3a-3c.

Exactly as described above for the first time period, a second sequence of aggregate images 50 is then acquired, and a map of defective areas 60 is formed in each of them, as shown in FIG. 5. Therefore, like in the first sequence, a second differential map 90 is formed, where only the "persistent" defective areas 100 in all the aggregate images 50 of the second sequence $S_1, S_2 \ldots S_N$ are maintained.

A comparison is then made between the first differential map 80 and the second differential map 90.

Due to the deceleration and subsequent acceleration of the container 8, the impurities 14 present inside the container 8 are "detached" from the internal surface 22 of the container and, when the second constant angular speed is reached, pushed again towards the internal surface 22, but almost certainly in a position which is different from the position assumed during the first time period.

The external impurities or defects 17 of the container, on the other hand, always remain in the same position and therefore in any differential map they maintain the same position.

Thus, by comparing the position of the persistent defective areas 70 of the first differential map 80 and the persistent defective areas 100 of the second differential map 90, if a first persistent defective area in the first differential map corresponds in the same position or in a region around it to a defective area in the second differential map, then the type of defect is an external impurity or defect, on the external surface of the side wall 20 of the container. This is, for example, the case of the "crack" denoted with 17 which is visible in FIG. 5 in the same position in the first and second differential map 80, 90. If, on the other hand, a second persistent defective area in the first differential map is no longer visible in the same position in the second differential map, and yet a defective area is present in a different position, then an impurity 14 is present inside the container and the container must therefore be discarded. This case can always be seen in FIG. 5 where in the first and second differential maps a persistent "moving" defective area is visible (indicated by 14).

Therefore, the comparison between the two differential maps highlights only the pixels whose intensity values have changed. This is due solely to the presence of impurities that occur at different points in the first differential map 80 compared to the second differential image 90.

This comparison between the two differential maps can be done, for example, as a simple operation of difference between the pixel intensities in the two differential maps.

The invention claimed is:

1. An apparatus for inspecting containers which are at least partially transparent to a predetermined electromagnetic radiation and which contain a liquid which is at least partially transparent to the predetermined electromagnetic radiation, the containers comprising at least one portion having radial symmetry about an axis of symmetry, the apparatus comprising:
   a rotation device which is adapted to rotate the container about the axis of symmetry;
   a camera which is positioned in such a manner that the container, when positioned, is located in the field of view thereof, the camera being sensitive to the predetermined electromagnetic radiation;
   a processing unit which is adapted to control the rotation device and the camera, the processing unit being programmed:
      to control the rotation device so as to move the container at a first angular speed and to keep the first angular speed constant for a first time period;
      to control the camera so that it acquires during the rotation at the first angular speed at least a first and a second series of images, each image of the first or second series being an image of a portion of the container and each series of images representing the portion of the container in a rotation thereof through 360°;
      to identify in the first and second series of images defective areas, each defective area having at least one characteristic which is different from the characteristics of the areas adjacent thereto, generating a first and a second map of the defective areas, each map comprising the position and the characteristics of the defective areas, identical positions in the first map and in the second map identifying the same position in the container;
      to compare the position of the defective areas of the first and the second maps;
      to establish presence of first impurities, said first impurities including impurities present in the container and impurities present in the liquid contained in the container, differentiating said first impurities from any bubbles in the liquid, if a defective area is present in a position in the first map and a defective area is present in a region surrounding the same position in the second map.

2. The apparatus according to claim 1, wherein the camera is sensitive to the electromagnetic radiation in the range of visible or infrared radiation.

3. The apparatus according to claim 1, comprising a light source of the predetermined electromagnetic radiation, the light source being positioned at an opposite side of the container with respect to the camera so as to back-light the container.

4. The apparatus according to claim 1, wherein the camera is a linear camera and each of the first or second series of images comprises a plurality of linear images which are acquired at constant angular intervals.

5. The apparatus according to claim 1, wherein the processing unit is further programmed:
   to control the rotation device so as to stop the container;
   to control the rotation device so as to rotate the container again, at a second angular speed, and to keep the second angular speed constant for a second time period;
   to control the camera until it acquires during the rotation at the second angular speed at least a third and a fourth series of images, each image of the third and fourth series of images being an image of a portion of the container and each third and fourth series of images representing the portion of the container in a rotation thereof through 360°;
   to identify in the third and fourth sequences of images defective areas, each defective area having at least one characteristic which is different from characteristics of the areas adjacent thereto, generating a third and a fourth map of the defective areas, each map comprising the position and the characteristic of the defective areas, identical positions in the third map and in the fourth map identifying the same position in the container;
   to compare the position of the defective areas of the third and the fourth maps;
   to establish presence of second impurities, said second impurities including impurities present in the container and impurities present in the liquid contained in the container, differentiating said second impurities from any bubbles in the liquid, if a defective area is present in a position in the third map and a defective area is present in a region surrounding the same position in the fourth map;
   to compare the position of the first impurities and the second impurities and establishing that an impurity is present in the liquid contained in the container when, in the position of one of the first impurities in the first or in the second map, no second impurity in a region surrounding the same position in the third or in the fourth map corresponds.

6. A method for inspecting containers comprising the steps of:
   providing a container which is at least partially transparent to a predetermined electromagnetic radiation and which contains a liquid which is at least partially transparent to the predetermined electromagnetic radiation, the container comprising at least one portion having radial symmetry about an axis of symmetry;
   rotating the container at a first angular speed and keeping the first angular speed constant for a first time period;

acquiring during the rotation at the first angular speed at least a first and a second sequence of images, each image of the first and second sequences being an image of a portion of the container and each sequence of images representing the portion of the container in a rotation thereof through 360°;

identifying in the first and second sequences of images defective areas, each of the defective areas having at least one characteristic which is different from the characteristics of the areas adjacent thereto, generating a first and a second map of the defective areas, each map comprising a position of and the characteristics of the defective areas, identical positions in the first map and in the second map identifying the same position in the container;

comparing the position of the defective areas of the first and the second maps;

establishing presence of first impurities, said first impurities including impurities present in the container and impurities present in the liquid contained in the container, differentiating said first impurities from any bubbles in the liquid, if one of the defective areas is present in a position in the first map and one of the defective areas is present in a region surrounding the same position in the second map.

7. The method according to claim 6, including the steps of:

stopping the rotation of the container;

rotating the container again at a second angular speed and keeping the second angular speed constant for a second time period;

acquiring during the rotation at the second angular speed at least a third and a fourth sequence of images, each image of the third and fourth sequences of images being an image of a portion of the container and each of the third and fourth sequences of images representing the portion of the container in a rotation thereof through 360°;

identifying in the third and fourth sequences of images defective areas, each defective area having at least one characteristic which is different from characteristics of areas adjacent thereto, generating a third and a fourth map of the defective areas, each map comprising a position of and the characteristics of the defective areas, identical positions in the third map and in the fourth map identifying the same position in the container;

comparing the position of the defective areas of the third and the fourth maps;

establishing presence of second impurities, said second impurities including impurities present in the container and impurities present in the liquid contained in the container, differentiating said second impurities from any bubbles in the liquid, if one of the defective areas is present in a position in the third map and one of the defective areas is present in a region surrounding the same position in the fourth map;

comparing the position of the first impurities and the second impurities and establishing that an impurity is present in the liquid contained in the container when, in the position of one of the first impurities in the first or in the second map, no second impurity in a region surrounding the same position in the third or in the fourth map corresponds.

8. The method according to claim 6, wherein the density of the liquid contained in the container is less than 2000 centipoise.

9. The method according to claim 6, comprising, between the step of stopping the rotation of the container; and the step of rotating the container again at a second angular speed; the step of:

keeping the container stopped for a third time period.

10. The method according to claim 7, wherein the first or the second angular speed is between 200 rpm and 10,000 rpm.

11. The method according to claim 7, wherein the first angular speed is equal to the second angular speed.

12. The method according to claim 6, comprising the step of:

back-lighting the container with the predetermined electromagnetic radiation.

13. The method according to claim 7, including the step of:

acquiring during the rotation at the first or second angular speed N sequence of images, with 2≤N≤10, each sequence of images representing the portion of the container in the rotation thereof through 360°.

14. The method according to claim 6, wherein identifying defective areas in the first and in the second sequences of images includes analyzing pixels which form the first and second sequences of images and identifying as one of the defective areas a cluster of pixels having characteristics different from pixels adjacent to the cluster.

15. The method according to claim 9, wherein the first or the second angular speed is between 200 rpm and 10,000 rpm.

16. The method according to claim 9, wherein the first angular speed is equal to the second angular speed.

17. The method according to claim 9, including the step of:

acquiring during the rotation at the first or second angular speed N series of images, with 2≤N≤10, each sequence of images representing the portion of the container in the rotation thereof through 360°.

* * * * *